UNITED STATES PATENT OFFICE.

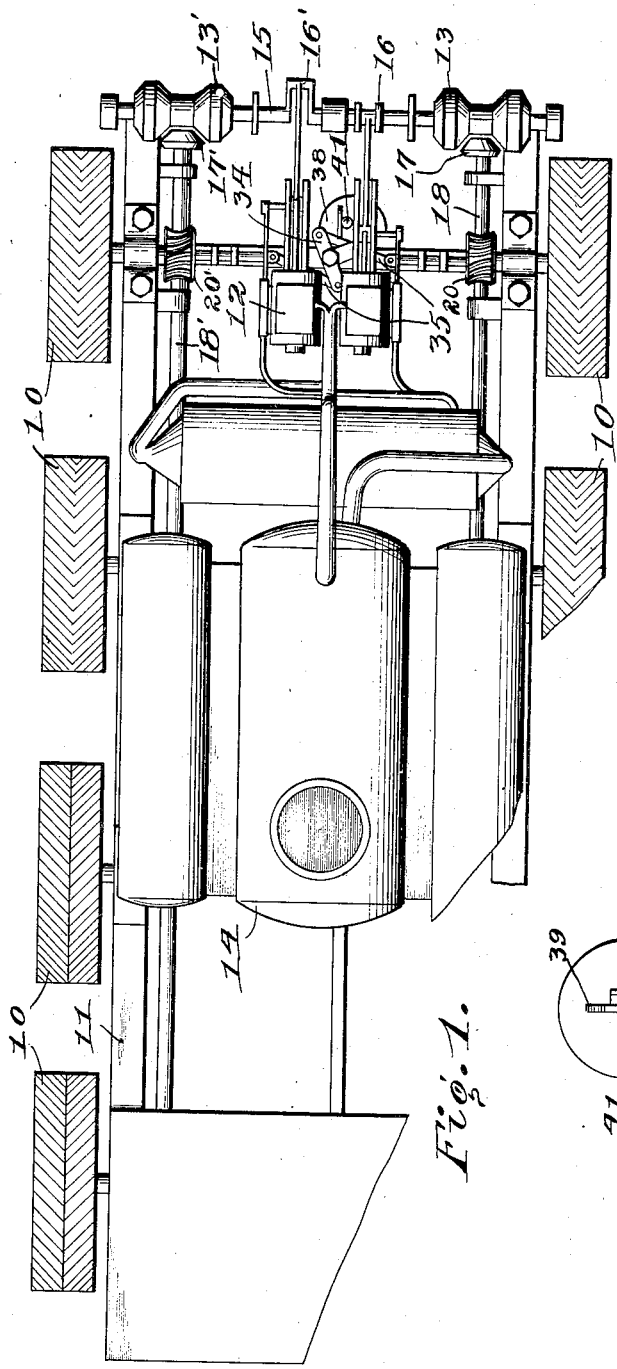

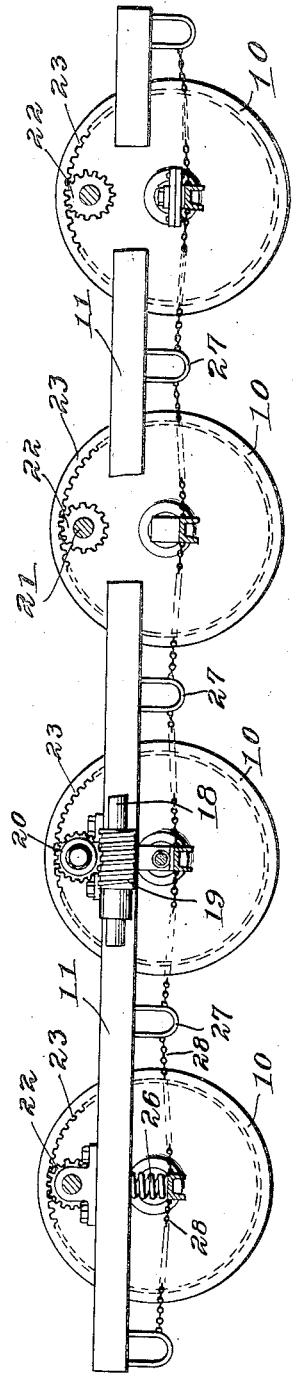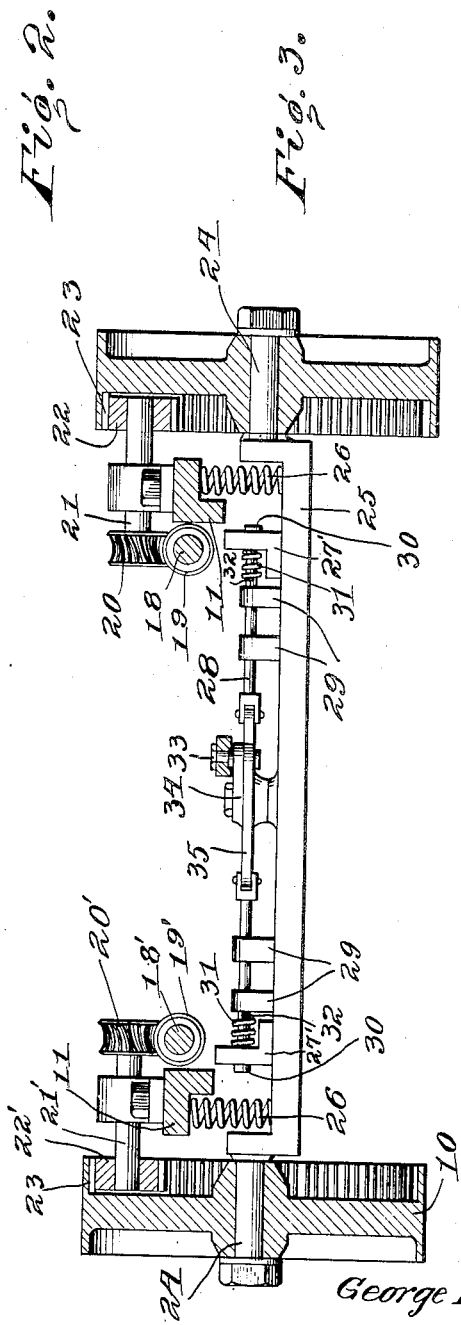

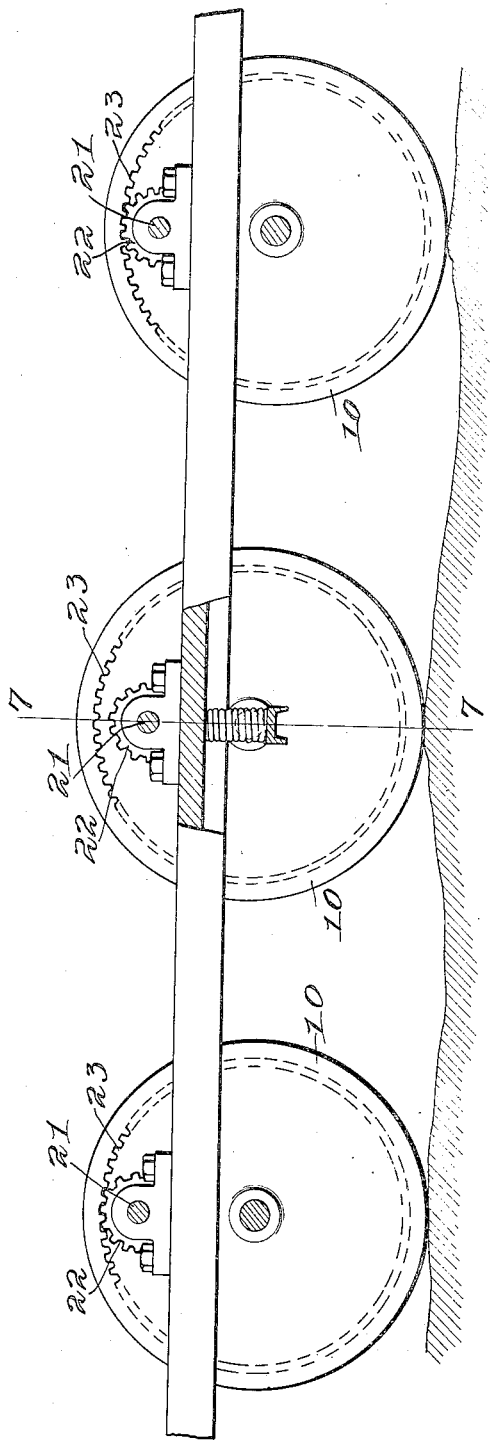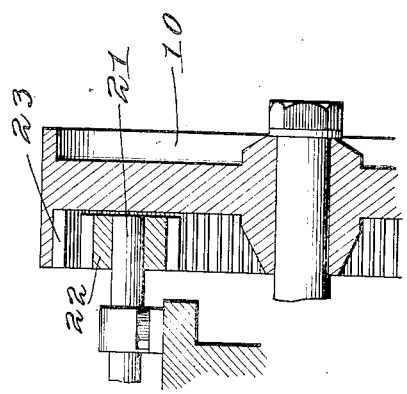

GEORGE R. ATKINS, OF MEMPHIS, TENNESSEE.

PIONEER-TRACTOR.

1,354,714.  Specification of Letters Patent.  Patented Oct. 5, 1920.

Application filed December 23, 1919.  Serial No. 346,842.

*To all whom it may concern:*

Be it known that I, GEORGE R. ATKINS, a citizen of the United States, residing at Memphis, in the county of Shelby and State of Tennessee, have invented certain new and useful Improvements in Pioneer-Tractors, of which the following is a specification.

One of the principal objects of my invention is the provision of a pioneer tractor adapted for use in rough country and particularly in the logging industry.

Another object is to provide such a tractor having a running gear such that when one of the wheels strikes a high place in the ground it will be immediately, and without attention of the operator, disengaged from the driving mechanism and when the high place is passed, will immediately resume its normal position and be connected to the driving mechanism again.

A still further object is the provision of such a tractor with a driving mechanism which will drive all the wheels on one side through a common operating means, the operating means of the sides being separately controllable in order to steer the machine.

Another and still further object of my invention is the provision of such a tractor having mechanism which, when a wide depression is to be passed, can be operated to prevent the springs between the axle and frame from compressing too far.

Referring now to the drawings:

Figure 1 is a plan view of the device, partly broken away, showing the general arrangement of the wheels and driving mechanism.

Fig. 2 is a side view of the running gear, partly broken away, showing the construction of, and adjacent to, the driving gear connections.

Fig. 3 is a cross sectional view showing the axle and gear connections and the means for limiting the relative movement between the frame and axles.

Fig. 4 is an enlarged view of a section of the frame showing three wheels, one of which is going over a high place on the ground.

Fig. 5 is a plan view of the means for operating the blocks which limit the relative movement between the frame and axle.

Fig. 6 is a fragmentary elevational view of the lever for operating the mechanism shown in Fig. 5.

Fig. 7 is a cross section on the line 7—7 of Fig. 4 showing the driving gear out of mesh.

Referring now to the several figures in which like reference characters refer to like parts throughout, 10 designates the driving wheels of the tractor. Supported upon the wheels 10 is a frame 11. 12 designates the engine which furnishes power for the traction and also furnishes power to the clutches 13 and 13' which may be used to furnish the power to the hoisting mechanism on the sled (not shown) which is in common use in the logging industry.

14 designates the boiler which is of the "Express" type in the embodiment illustrated, but it is to be understood that my invention is not limited to any particular make of boiler or even to a steam power plant since a gasolene motor may be used without departing from the spirit of my invention. The preferred embodiment however is as illustrated since fuel wood is easily obtainable in a logging country.

The engine is connected to a shaft 15 in any suitable manner as by the cranks 16, 16'. Upon the shafts 15 is mounted the clutches 13, 13'. While these clutches may be of any suitable type, I prefer the type as set forth in my co-pending application, Serial Number 346841, filed Dec. 23, 1919.

Geared to the clutches 13, 13' by gears 17, 17' are the shafts 18, 18'. Referring now more particularly to Figs. 2 and 3 in which the gearing for the traction wheels is shown in detail, 19, 19', designate worms mounted on shafts 18, 18' and which engage worm wheels 20 and 20' respectively. The wheels 20 and 20' are mounted upon cross shafts 21, 21' which have at their outer ends the gear pinions 22, 22' respectively. Within the rim of each of the traction wheels 10 is an internal gear 23. These gears operate with the pinions 22, 22' to drive the wheels and cause the machine to travel over the ground.

The wheels 10 are carried by the trunnions 24, which in turn are carried by axles 25. Between each end of each axle 25 and the adjacent portion of the longitudinal members of the frame 11 are situated supporting springs 26, which support the frame upon the axles and take care of the undulations in the surface of the ground.

Attached to the sides of the frame 11 and midway between the wheels are the U-shaped members 27. Extending from these members 27 to the axles are flexible members such as the chains 28. The purpose of these chains is to limit the downward movement of the axles 25, with relation to the frame and therefore limit the expansion of the springs 26 and prevent the teeth of the gears 22 and 23 from engaging the bottoms of the corresponding spaces between the opposite teeth. These chains also limit the swinging movement of the axles longitudinally of the direction of travel of the machine.

The supporting and driving gear of my machine is so constructed that it will support and carry a heavy tractor frame and engine even though the ground be rough and have many obstructions. These irregularities are taken care of as follows:

When any particular wheel meets an obstruction it compresses its spring 26, moves upward and disengages its internal gear 23 from the pinion 22. This leaves the wheel free to pass over its obstruction while the traction is attended to by the other wheels.

When however the machine passes over a wide depression in the ground, a difficult situation arises, since the weight will all have to be borne by four of the wheels when the depression is wide enough to include two pairs of wheels. This condition is taken care of by the following structure which is operable at the will of the operator:

Referring particularly to Figs. 3, 5 and 6, 27' designates angle blocks slidably mounted on the axles and adjacent the respective sides of the main frame. These members 27' are mounted about a rod 28 which is mounted on the axles in suitable guides such as 29. On the outer ends of the rods 28 are heads 30 which limit the movement of the blocks 27'. Around the rods 28 and adjacent the blocks 27' are compression springs 31. These springs are held in compression by the blocks 27' at one end and the pins 32 at the other end. Between the inner ends of the rods 28 and pivoted to the axle 25 at 33 is a T-lever 34, which is connected to the rod 28 by the connecting links 35 as shown best in Fig. 5. The member 36 of the T-lever 34 is connected to a flat longitudinal rod 37 extending the length of the machine and near its center in position to control the movements of all of the T-levers 34. Extending from the forward axle at 38 is a platform (Fig. 5) upon which is mounted a quadrant 39. Pivotally mounted at 40 on the quadrant 39 is a lever 41 which is operatively connected to the rod 37 by the pin and slot connection 42.

When the machine is in motion and the operator observes a wide depression over which the machine must pass he presses the lever 41 forward. This throws the rod 37 to the rear, swings the T-levers, forcing the rods 28 outward. This action forces the blocks 27' underneath the frame members thus limiting the relative movement between the frame and axles. In case any wheel should be going over an obstruction when the lever 41 is operated, the spring 31 permits the block 27' to stop against the frame, thus compressing the spring 31 but permitting the other blocks to assume their proper places between the frame and axles. When the obstruction is passed, the spring presses the blocks between the frame and axle as soon as the axle has lowered to its normal position. When the depression is passed, the lever 41 is brought back to normal position and the springs permitted to act as hereinbefore described.

This device is not intended for extensive operation on a road. When however it becomes necessary to steer the machine one or the other of the clutches 13, 13' is thrown out of operation thereby permitting the other side shaft 18 or 18' to operate and cause the corresponding side of the machine to advance faster than the side upon which the clutch is out of gear.

While I have described my invention somewhat in detail it is to be understood that the invention is not limited to the form, proportions and dimensions of the parts shown nor to the particular worm gears shown and described. It is to be understood that the well known mechanical equivalents of parts, such as bevel gears for the worm gears, are intended to be included within the scope of the appended claims.

Having described my invention, what I claim is:—

1. A pioneer tractor comprising a frame, a plurality of pairs of wheels for supporting the same, axles for carrying the wheels, springs between the axles and frame, a gear revoluble with each wheel, a pinion in mesh with each of the gears, a cross shaft carrying the pinion, a worm gear on each cross shaft, shafts mounted on the frame and extending along each side of the tractor, worms mounted on the last mentioned shaft and in engagement with the worm gears, a drive shaft operatively connected to the side shafts, motor means for driving the drive shaft, movable blocks in position to be placed between the frame and axle, rods for moving the blocks, springs connecting the rods and blocks, levers pivotally mounted on the axles and connected to the rods, a longitudinally extending rod operatively connected with the levers of the several axles and a lever for operating the longitudinally extending rod.

2. A pioneer tractor comprising a frame, a plurality of pairs of wheels for supporting the same, axles for carrying the wheels, springs between the axles and frame, a gear revoluble with each wheel, a pinion in mesh with each of the gears, a cross shaft journaled in the frame, and carrying the pinion, a worm gear on each cross shaft, shafts mounted on the frame and extending above each side of the tractor, worms mounted on the last mentioned shaft and in engagement with the worm gears, a drive shaft operatively connected to the side shafts, and motor means for driving the drive shaft.

3. A pioneer tractor comprising a frame, a plurality of pairs of wheels for supporting the same, axles for carrying the wheels, springs between the axles and frame, a gear revoluble with each wheel, a pinion in mesh with each of the gears, a cross shaft carrying the pinion, a worm gear on each cross shaft, shafts mounted on the frame and extending above each side of the tractor, worms mounted on the last mentioned shaft and in engagement with the worm gears, a drive shaft operatively connected to the side shafts, motor means for driving the drive shaft and means for limiting the upward movement of the axle relative to the frame.

4. A pioneer tractor comprising a frame, a plurality of pairs of wheels supporting the frame, axles for carrying the wheels, a gear revoluble with each wheel, a driving gear journaled in the frame and means including springs whereby any wheel may rise relatively to the frame, and while so raised, have its gear disengaged from the driving gear.

5. A pioneer tractor comprising a frame, a plurality of pairs of wheels supporting the frame, axles for carrying the wheels, a gear revoluble with each wheel, a driving gear journaled in the frame, and means including springs whereby any wheel may rise relatively to the frame, and while so raised, have its gear disengaged from the driving gear and reëngaged when the wheel resumes its normal position.

6. In a pioneer tractor a frame, wheels, a motor, connections between the motor and wheels, axle means for said wheels and frame and movable relative to the frame, means for limiting the relative movement between the frame and axle means, comprising resiliently mounted movable blocks and means for moving said blocks between the frame and axle means.

7. In a pioneer tractor a frame, wheels, a motor, connections between the motor and wheels, axle means for said wheels and frame and movable relative to the frame, means for limiting the relative movement between the frame, and axle means, comprising rods mounted on opposite sides of the middle of the axle, movable blocks resiliently mounted on the rods, lever means for operating simultaneously the blocks on opposite rods to force the blocks between the frame and axle thereby limiting their movement, one relative to the other.

8. In a pioneer tractor a frame, wheels, a motor, connections between the motor and wheels, axle means for said wheels and frame and movable relative to the frame, means for limiting the relative movement between the frame and axle means, comprising rods mounted on opposite sides of the middle of the axles, movable blocks resiliently and slidably mounted on the rods, levers mounted between the rods, links connecting the levers and rods, a reach rod extending between the axles and connected to the levers, a hand lever operatively connected to the reach rod to operate the same and in turn operate the levers, rods and blocks to place the latter between the axle means and the frame to limit the movement of one relative to the other.

In testimony whereof I affix my signature.

GEORGE R. ATKINS.